3,544,342
BLUING COMPOUNDS AND THEIR PRODUCTION
George R. Numrich, Jr., R.D. 3, Box 266,
Kingston, N.Y. 12401
No Drawing. Filed Mar. 4, 1968, Ser. No. 709,895
Int. Cl. C09d 11/00, 13/00, 5/00
U.S. Cl. 106—19                                1 Claim

ABSTRACT OF THE DISCLOSURE

Bluing compounds which are particularly useful on firearms for touching up worn spots, scrapes and nicks are produced by reacting selenium and nitric acid to form selenous acid, forming a copper sulphate solution to which an alkylaryl polyether alcohol and a blue dye are added and to this solution adding the selenous acid previously formed.

---

The present invention is concerned with bluing compounds and their production. More particularly, the bluing compounds of the present invention are particularly effective for use as a gun blue and for touching up worn spots on firearms caused by holsterwear, as well as nicks and scrapes on firearms themselves. Application of the bluing composition to the surface to be treated produces a long lasting finish.

According to the present invention, bluing compounds are produced according to a two stage reaction. In the first step, selenium and nitric acid are reacted to form selenous acid. In the second step, a copper sulphate solution is formed and to this solution an alkylaryl polyether alcohol and a blue dye are added. Selenous acid formed in the first stage is then added, and a final bluing compound is recovered.

According to the present invention, the preferred blue dye is one having a Color Index number Acid Blue 61. The preferred alkylaryl polyether alcohols include Triton X–30, Triton X–45, Triton X–100, Triton X–120 and Triton X–166, these compounds are octylphenol hydrophobes of the general formula

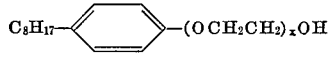

$$C_8H_{17}-\underset{}{\underset{}{\bigcirc}}-(OCH_2CH_2)_xOH$$

According to the present invention, powdered metallic selenium is slowly added to nitric acid in a vessel suitably equipped to exhaust the oxides of nitric produced during the reaction. The temperature of the reaction should not be allowed to exceed 150° F. After all of the selenium has been added, the resultant solution should be agitated until no further gas appears on the surface and the color of the selenous acid formed should be straw or a pale yellow.

A copper sulphate solution is then formed, such as by the addition of copper sulphate crystals to water, and agitation will assist the copper sulphate to thoroughly dissolve in the solution. With the copper sulphate solution under continuous agitation, the desired alkylaryl polyether alcohol and the blue dye are then added. When the components are thoroughly mixed and in solution, the selenous acid previously produced is added under agitation to form the final bluing compound which is then in solution form.

As checks on the stages of process, the pH of selenous acid will be approximately 0.95 and the specific gravity approximately 1.47. The specific gravity of the final solution will be 1.09.

The following nonlimitative example illustrates the present invention:

|                                         | Pounds  |
|-----------------------------------------|---------|
| Selenium 99.5% + pure                   | 178.5   |
| Nitric acid 40° Bé. (61.4% $HNO_3$)     | 465.0   |
| Yield selenous acid $H_2SeO_3$          | 472.5   |
| Copper sulphate ($CUSO_45H_2O$)         | 152.0   |
| Water (120° F.)                         | 3,500.0 |
| Alkylaryl polyether alcohol             | 40.0    |
| Blue dye (C.I. Acid Blue 61)            | 0.5     |
| Water (212° F.)                         | 15.0    |

A suitable vessel for use in the present process is a clean dry stainless steel kettle, suitably jacketed for heating and cooling and equipped with an exhaust system capable of handling oxides of nitrogen. The kettle should also be equipped with a slow speed mixing propeller located so that it is entirely beneath the surface of the liquids added to the tank. This reaction vessel is then charged with 40° Bé. nitric acid. The temperature of the acid should be adjusted to about 100° F. Substantially powdered metallic selenium is slowly introduced into the acid at a rate of approximately one pound per minute. During the addition of the selenium, the temperature of the bath will begin to rise as a result of the exothermic reaction, and the temperature should not be allowed to exceed 150° F.

After all of the selenium has been added, the resultant solution is agitated until no further gas appears on the surface and the color of the resultant selenous acid formed is straw or a pale yellow. The color of the solution at this point can be determined by filtration of the impurities which are left as residue from the selenium. This reaction yields approximately 472.5 pounds of selenous acid which is then filtered to remove impurities and which is removed from the reactor and held for future use.

After the reaction vessel is thoroughly cleaned, 3,500 pounds of water of a temperature of 120° F. is added together with approximately 152 pounds of copper sulphate crystals which are added to the water under agitation. Agitation is continued until the copper sulphate is thoroughly dissolved. The copper sulphate solution is then continuously agitated while 40.0 pounds of the desired alkylaryl polyether alcohol, such as Triton X–30, Triton X–45, Triton X–100, Triton X–120 and Triton X–166, is slowly added. After this addition has been completed, and the alcohol is thoroughly dissolved, 0.05 pound of a blue dye Color Index number Acid Blue 61 dissolved in 15 pounds of boiling water is added to the solution. When the reactants are thoroughly dissolved, the 472.5 pounds of selenous acid previously formed is added and agitation is continuous until all reactants are thoroughly dissolved. The resultant solution is the final bluing compound.

What is claimed is:
1. A process for the production of a bluing compound for use on metal surfaces which comprises:
  (a) reacting substantially pure selenium with nitric acid in the ratio of about 178.5 lbs. to about 465 lbs., said ratio producing about 472.5 lbs. of selenous acid, by
    (1) charging a suitable reaction vessel with nitric acid 40° Bé. (61.4% $HNO_3$) at a temperature of about 100° F.;

(2) adding metallic selenium in powdered form to the acid at a rate of about 1 lb. per minute;

(3) maintaining the reaction temperature at a temperature not in excess of 150° F.;

(4) agitating the resultant solution until no further gas appears on the surface and the color of the selenous acid formed is straw or pale yellow; and (5) recovering the selenous acid;

(b) adding to a clean suitable reaction vessel 3,500 lbs. of water at a temperature of about 120° F. together with 152 lbs. of copper sulphate crystals;

(c) agitating the mixture until dissolution is complete;

(d) adding 40 lbs. of an alkylaryl polyether alcohol to the aqueous copper sulphate solution under agitation;

(e) adding a solution of 0.05 lb. of blue dye of Color Index number Acid Blue 61 per 15 lbs. of boiling water to the solution of (d);

(f) adding 472.5 lbs. of selenous acid formed according to (a) to the solution of (e), the weight of the components in (b) through (e) being per 472.5 lbs. of selenous acid added to solution (e); and (g) agitating the solution formed to produce a uniform bluing compound.

References Cited
UNITED STATES PATENTS

| | | | |
|---|---|---|---|
| 2,527,232 | 10/1950 | Scroxton | 148—6.24 |
| 2,846,343 | 8/1958 | Mason | 148—6.24 |
| 2,933,422 | 4/1960 | Mason | 148—6.24 |
| 2,937,594 | 5/1960 | Miesse | 148—6.24 |

JULIUS FROME, Primary Examiner

J. B. EVANS, Assistant Examiner

U.S. Cl. X.R.

106—286; 117—128, 130, 162; 148—6.1, 6.24